(12) United States Patent
Khurd et al.

(10) Patent No.: US 8,983,230 B2
(45) Date of Patent: Mar. 17, 2015

(54) GLOBAL ERROR MINIMIZATION IN IMAGE MOSAICKING USING GRAPH LAPLACIANS AND ITS APPLICATIONS IN MICROSCOPY

(75) Inventors: Parmeshwar Khurd, Princeton, NJ (US); Rafiou Oketokoun, North Reading, MA (US); Ali Kamen, Skillman, NJ (US); Leo Grady, Millbrae, CA (US); Hari Sundar, Austin, TX (US); John V. Frangioni, Wayland, MA (US); Tejas Gajera, Lawrenceville, NJ (US)

(73) Assignees: Siemens Corporation, Iselin, NJ (US); Beth Israel Deaconess Medical Center, Boston, MA (US)

( * ) Notice: Subject to any disclaimer, the term of this patent is extended or adjusted under 35 U.S.C. 154(b) by 121 days.

(21) Appl. No.: 13/810,940

(22) PCT Filed: Jul. 25, 2011

(86) PCT No.: PCT/US2011/045169
§ 371 (c)(1),
(2), (4) Date: May 20, 2013

(87) PCT Pub. No.: WO2012/015732
PCT Pub. Date: Feb. 2, 2012

(65) Prior Publication Data
US 2013/0243352 A1    Sep. 19, 2013

Related U.S. Application Data

(60) Provisional application No. 61/367,484, filed on Jul. 26, 2010.

(51) Int. Cl.
G06K 9/36        (2006.01)
G06K 9/32        (2006.01)
G06T 11/60      (2006.01)
(Continued)

(52) U.S. Cl.
CPC .............. *G06T 11/60* (2013.01); *G06T 3/0068* (2013.01); *G06T 3/4038* (2013.01); *G06T 2207/10056* (2013.01); *G06T 7/0026* (2013.01); *G06T 2200/32* (2013.01); *G06T 2207/30024* (2013.01)
USPC ........................................... 382/284; 382/294

(58) Field of Classification Search
None
See application file for complete search history.

(56) References Cited

U.S. PATENT DOCUMENTS 6,097,854 A * 8/2000 Szeliski et al. ................ 382/284
6,359,617 B1   3/2002 Xiong
(Continued)

FOREIGN PATENT DOCUMENTS

EP    1870856    * 12/2007

OTHER PUBLICATIONS

Marzotto, R.; Fusiello, A; Murino, V., "High resolution video mosaicing with global alignment," Computer Vision and Pattern Recognition, 2004. CVPR 2004. Proceedings of the 2004 IEEE Computer Society Conference on, vol. 1, no., pp. I-692,I-698 vol. 1, Jun. 27-Jul. 2, 2004.*

(Continued)

*Primary Examiner* — Andrae S Allison

(57) ABSTRACT

An image mosaicking method includes performing pairwise registration of a plurality of tiles (101), determining absolute homographies for each of the plurality of tiles according to the pairwise registration (102B), and performing a blending of the plurality of tiles to obtain a stitched image according to the absolute homographies (103).

12 Claims, 4 Drawing Sheets

(51) Int. Cl.
  *G06T 3/00* (2006.01)
  *G06T 3/40* (2006.01)
  *G06T 7/00* (2006.01)

(56) References Cited

U.S. PATENT DOCUMENTS

| | | | |
|---|---|---|---|
| 7,076,116 B2 * | 7/2006 | Horie | 382/284 |
| 7,400,782 B2 * | 7/2008 | Zhou et al. | 382/284 |
| 7,409,105 B2 * | 8/2008 | Jin et al. | 382/284 |
| 7,693,348 B2 * | 4/2010 | Zavadsky et al. | 382/294 |
| 7,945,117 B2 * | 5/2011 | Hermosillo Valadez et al. | 382/294 |
| 2004/0184010 A1 | 9/2004 | Raskar et al. | |

OTHER PUBLICATIONS

Mosaics of Scenes With Moving Objects; James Davis. In Computer Vision and Pattern Recognition, 1998 IEEE Computer Society Conference Proceedings, Jun. 23, 1998 (pp. 354-360).

High Resolution Video Mosaicing With Global Alignment; Marzotto, et al. In Proceedings of the 2004 IEEE Computer Society Conference on Computer Vision and Pattern Recognition, vol. 1, Jun. 27, 2004 (8 Pages).

A Global Optimization Approach for Construction of Panoramic Mosaics; Wang, et al. In MIPPR 2009: Automatic Target Recognition and Image Analysis, Proc. of SPIE vol. 7495, Oct. 30, 2009 (pp. 74950F-1 to 74950F-8).

A Graph-based Global Registration for 2D Mosaics; Eun-Young Kang, Isaac Cohen, Gerard Medioni.

* cited by examiner

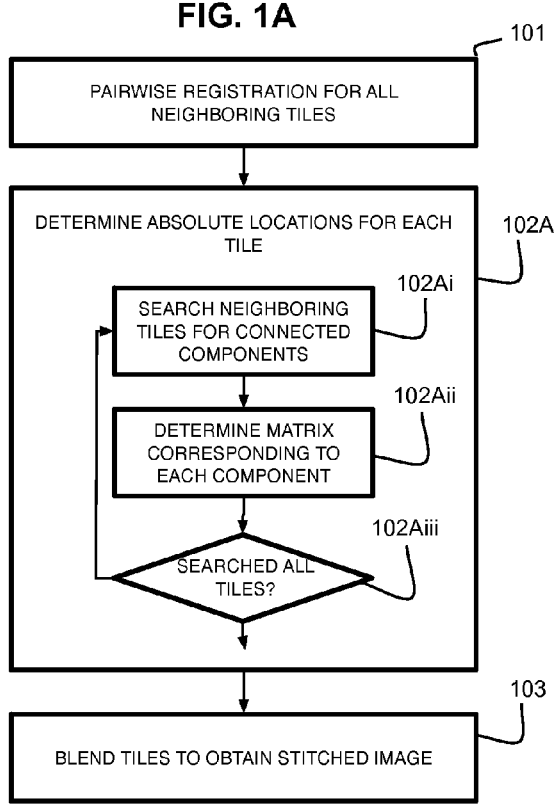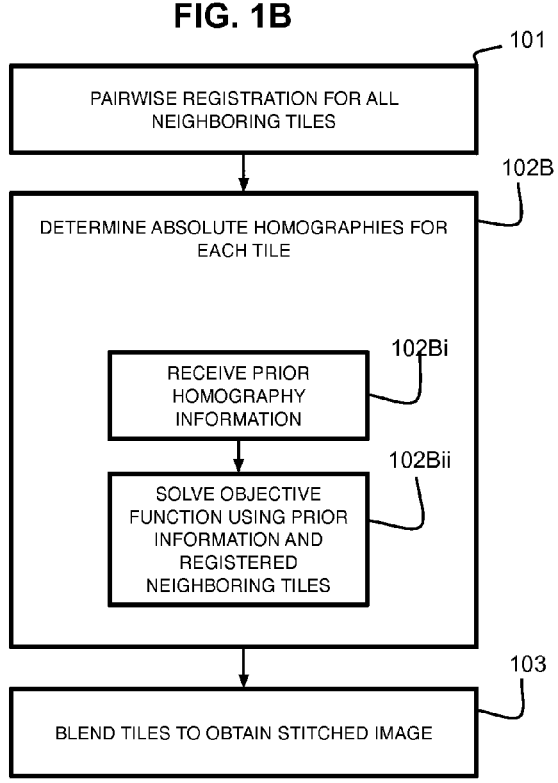

is a system for executing an image mosaicking method according to an embodiment of the present disclosure.

GLOBAL ERROR MINIMIZATION IN IMAGE MOSAICKING USING GRAPH LAPLACIANS AND ITS APPLICATIONS IN MICROSCOPY

CROSS-REFERENCE TO RELATED APPLICATION

This is a non-provisional application claiming the benefit of U.S. provisional application Ser. No. 61/367,484, filed Jul. 26, 2010, the contents of which are incorporated by reference herein in their entirety.

BACKGROUND

1. Technical Field

The present disclosure relates to image editing, and more particularly to an image mosaicking method.

2. Discussion of Related Art

Several applications, such as underwater sea-floor mapping, microscopy, etc., require the mosaicking of images or tiles acquired by a camera as the camera traverses an unknown trajectory in three dimensional (3D) space.

A homography relates the image coordinates of a point in each tile to those of a reference tile provided the image surface is planar. One exemplary approach in such applications is to first perform pairwise alignment of the tiles that have imaged common features (points) in order to recover a homography relating the tile pair and to then find the global set of homographies relating each individual tile to a reference tile such that the homographies relating all tiles pairs are kept as consistent as possible.

Using these global homographies, one can generate a mosaic of the entire scene.

BRIEF SUMMARY

According to an embodiment of the present disclosure, an image mosaicking method includes performing pairwise registration of a plurality of tiles, determining absolute homographies for each of the plurality of tiles according to the pairwise registration, and performing a blending of the plurality of tiles to obtain a stitched image according to the absolute homographies.

According to an embodiment of the present disclosure, an image mosaicking method includes performing pairwise registration of a plurality of tiles, determining absolute locations for each of the plurality of tiles according to the pairwise registration, and performing a blending of the plurality of tiles to obtain a stitched image according to the absolute locations.

According to an embodiment of the present disclosure, an image mosaicking method includes performing pairwise registration of a plurality of tiles, receiving prior homography information for each of the plurality of tiles, determining absolute homographies for each of the plurality of tiles according to the pairwise registration and the prior homography information of each of the plurality of tiles, and performing a blending of the plurality of tiles to obtain a stitched image according to the absolute homographies.

BRIEF DESCRIPTION OF THE DRAWINGS

Preferred embodiments of the present disclosure will be described below in more detail, with reference to the accompanying drawings:

FIGS. 1A-B are flow diagrams of an image mosaicking method according to an embodiment of the present disclosure;

DETAILED DESCRIPTION OF PREFERRED EMBODIMENTS

Figure 2:
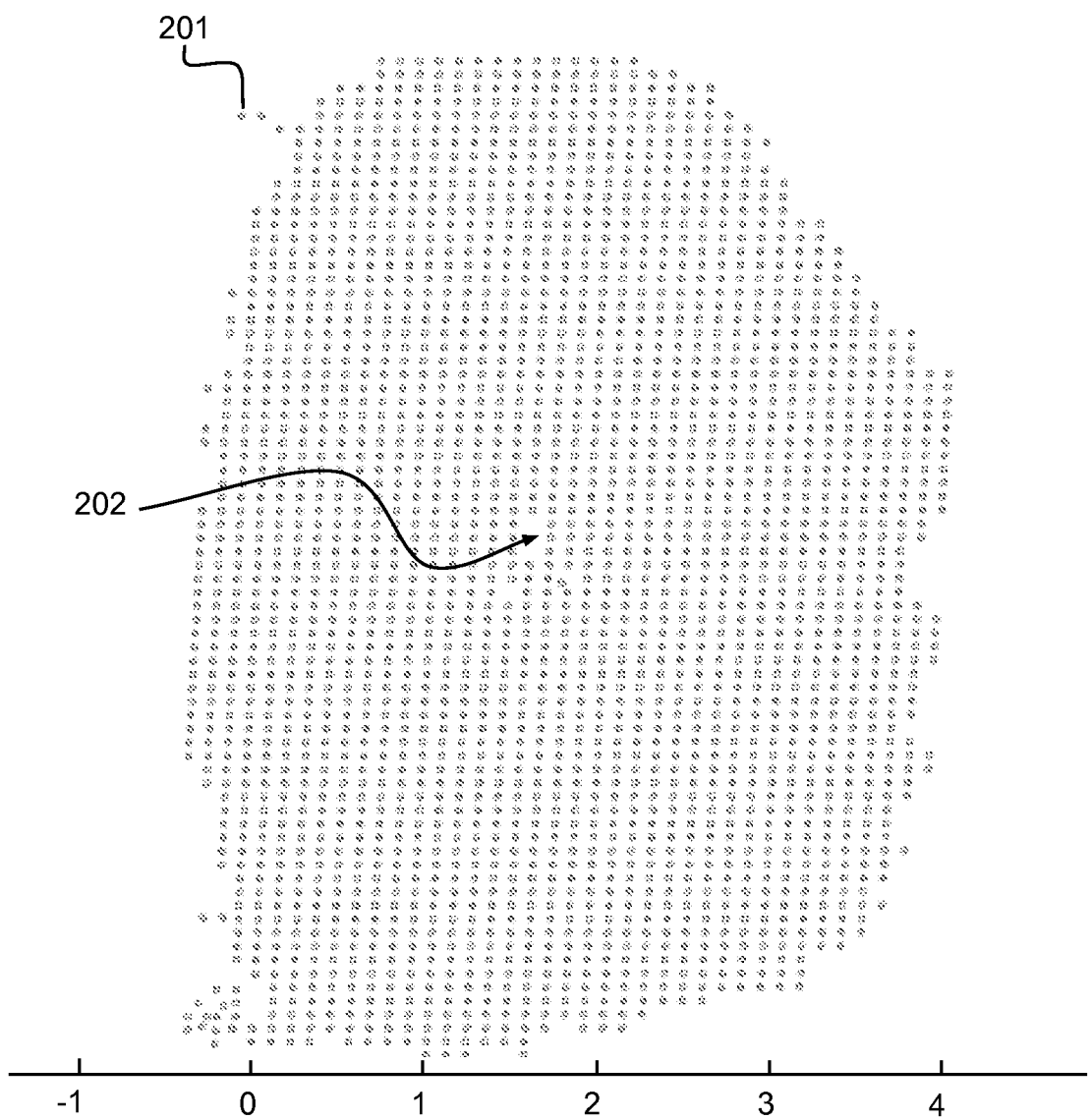
FIG. 2 shows exemplary X-Y coordinates for a component of a specimen comprising 79×34 tiles according to an embodiment of the present disclosure.

According to an embodiment of the present disclosure, a global homography may be determined from the pairwise homographies via global error minimization under an assumption that a 3D object being imaged is planar.

According to an embodiment of the present disclosure, an image mosaicking method (see FIGS. 1A-B) includes performing pairwise registration for all neighboring tiles (101). The pairwise registration may include maximizing a similarity measure such as a normalized cross-correlation (NCC) function. By way of example, a normalized cross-correlation may be used as a similarity measure, which normalizes the image and feature vectors to unit length, yielding a cosine-like correlation coefficient. This operation can be performed in a transform domain.

The method includes obtaining or determining absolute locations for each tile (102A—FIG. 1A) or absolute homographies for each tile (102B—FIG. 1B) (e.g., in the case of a general transformation). Referring to FIG. 1A, the absolute locations may be obtained by solving a linear system such that the global measure of registration in (6) is minimized. For example, the linear system can be solved using conjugate gradients with an incomplete Cholesky preconditioner.

The method further includes performing a blending to obtain a stitched image with non-overlapping tiles (103). The blending may be performed using techniques including an alpha-blending approach to assign different tiles various transparency settings. A weight α can be found by raising the normalized distance of a pixel from the edge of its tile to an exponent.

The following describes exemplary methods corresponding to blocks 102A and 102B for determining absolute locations and absolute homographies for each tile.

According to an embodiment of the present disclosure, it may be assumed that N images or tiles (herein after tiles) have been acquired by a camera. A global homography for tile i may be expressed as $$M_i = K\left(R_i - \frac{1}{d_i} p_i n^T\right) K^{-1},$$

where K denotes the intrinsic camera matrix, $R_i$ denotes the rotation of the camera axis of tile i with respect to a reference tile, $p_i$ denotes the translation of the tile i's center with respect to a reference tile's center, n and $d_i$ are the normal vector of the plane and the distance to the plane, respectively.

A connectivity graph may be formed between all acquired tiles by planning an edge between tiles that share a border. Let Nbd(i) denote the set of tiles that share any overlap with tile i. Let $M_{ij}$ denote the pairwise homography between tiles i and j found via pairwise alignment. It should be understood that a homography is an invertible transformation between projective planes that maps straight lines to straight lines. To determine global homographies, the following objective function may be minimized:

$$E(M_1, \ldots, M_N) = \frac{1}{2}\sum_{i=1}^{N}\sum_{j \in Nbd(i)} dist(M_i, M_{ij}, M_j)^2 \quad (1)$$

The squared distance between any two homography matrices A and B may be taken as $\Sigma_m \Sigma_n (A_{mn} - B_{mn})^2 = \text{Trace}((A-B)(A-B)^T)$, which is a squared Frobenius norm of A−B. Alternative matrix distance measures such as those based upon the Log-Euclidean transform or the Baker-Campbell-Hausdorff formula may also be used. Note that it may be desirable to use two symmetric distance measures subject to $dist(M_i, \tilde{M}_{ij}, M_j)^2 = dist(M_j, \tilde{M}_{ji}, M_i)^2$, a condition that may be satisfied by the squared Frobenius norm as shown below:

$$[Fro(M_j - \tilde{M}_{ji}M_i)]^2 = [Fro(\tilde{M}_{ji}(M_i - \tilde{M}_{ji}M_i))]^2 \quad (2)$$
$$= \text{Trace}(\tilde{M}_{ji}(M_i - \tilde{M}_{ij}M_j)(M_i - \tilde{M}_{ij}M_j)^T \tilde{M}_{ji}^T)$$
$$= \text{Trace}((M_i - \tilde{M}_{ij}M_j)(M_i - \tilde{M}_{ij}M_j)^T)$$
$$= [Fro(M_i - \tilde{M}_{ij}M_j)]^2.$$

The first equality in (2) assumes inverse consistency in the pairwise registration, i.e., $\tilde{M}_{ij} = \tilde{M}_{ji}^{-1}$. The second-to-last equality follows from the fact that a similarity transformation does not affect the eigenvalues or the trace of a matrix.

The minimum of the objective function in (1) can be found by setting its gradient to zero. The gradient of the objective function in (1) with respect to homography matrix $M_i$ may be determine as:

$$\nabla_{M_i} E(M_1, \ldots, M_N) = \sum_{j \in Nbd(i)} \nabla_{M_i} [Fro(M_i - \tilde{M}_{ij}M_j)]^2 \quad (3)$$

Note that $$\nabla_{M_i}[Fro(M_i - \tilde{M}_{ij}M_j)] = \nabla_{M_i}\text{Trace}((M_i - \tilde{M}_{ij}M_j)(M_i - \tilde{M}_{ij}M_j)^T) = 2(M_i - \tilde{M}_{ij}M_j).$$

Assuming that a reference homography $M_N$ is fixed, the remaining N−1 homographies may be solved for by solving the following set of N−1 simultaneous matrix equations:

$$\sum_{j \in Nbd(i)} (M_i - \tilde{M}_{ij}M_j) = 0 \quad (4)$$

Each such matrix equation is equivalent to a set of 9 scalar equations for the individual matrix elements. Other than the reference homography $M_N$, the $(a,b)^{th}$ elements $M_i^{(a,b)}$ of the set of the remaining 3×3 matrices $\{M_i\}$ may be concatenated into a vector x and then this vector may be determined by solving the simultaneous equations. This is equivalent to solving the linear system Ax=y, where A is a 9(N−1)×9(N−1) matrix. The exact form of A and y is given below:

$$A_{iab;iab} = \sum_{j \in Nbd(i)} 1 \quad \forall\, i \in 1, \ldots, N-1\, \forall\, a, b \in \{1, 2, 3\} \quad (5)$$
$$A_{iab;icd} 0, \quad \forall\, a, b, c, d \in \{1, 2, 3\} \text{ and } (c \neq a \text{ or } d \neq b)$$
$$A_{iab;jab} = -\tilde{M}_{ij}^{ac}, \quad \text{if } j \in Nbd(i) \text{ and } j \neq i\, \forall\, a, b, c \in \{1, 2, 3\}$$
$$A_{iab;jcd} = 0, \quad \text{if } j \in Nbd(i) \text{ and } j \neq i\, \forall\, a, b, c, d \in \{1, 2, 3\} \text{ and } d \neq b$$
$$A_{iab;jcd} = 0, \quad \text{if } j \notin Nbd(i) \text{ and } j \neq i\, \forall\, a, b, c, d \in \{1, 2, 3\}$$
$$y_{iab} = \sum_{c=1}^{3} \tilde{M}_{iN}^{ac} M_N^{cb} \quad \text{if } N \in Nbd(i)$$
$$y_{iab} = 0 \quad \text{if } N \notin Nbd(i)$$

Note that the above derivation assumes a general 3×3 homography matrix without any constraints on its form. However, general homography matrices have at most 8 degrees of freedom (up to scale), with 3 degrees of freedom each for the rotations and translations, and additional degrees of freedom arising from the variations in the intrinsic camera matrix during the scanning process, due to a changing focus, for example. This 8-degree homography problem may be solved by setting $M_i^{(3,3)}=1$ for all homographies and dropping the corresponding rows and columns of A to get a 8(N−1)×8(N−1) matrix. The vector y may also be updated with the appropriate terms transferred from the original left-hand side.

In case the intrinsic matrix is fixed, but both translations and rotations are allowed, the homography matrix has the form $M_i = R_i - t_i n^T$ and has only six degrees of freedom (the scalar factor $d_i$ has been absorbed into $t_i$). In this case, $R_i$ and $t_i$ may be recovered from the $M_i$ found by the 8(N−1)×8(N−1) linear system solver.

For other special cases of homographies such as pure rotations, which may occur when the camera is rotated from a single vantage point to cover a large wall painting, these constraints may be imposed on the solution found via the 8(N−1)×8(N−1) linear system solver using the singular value decomposition (SVD) based rotation extraction approach.

For the case of 2D translations, only two independent equations need be obtained per matrix equation and additional constraints on the resulting linear system solution may not be needed, as demonstrated by the first-principles. An exemplary case of multiple connected components in the graph connectivity is also described herein.

Exemplary image mosaicking methods can be used in histological microscopic imaging. Since the motion reported by a slide-scanning microscopy X-Y stage in histophology imaging may be unreliable and an image-based mosaicking method may be useful in determining an accurate composite image. Assuming that the microscope moves in a plane parallel to the planar specimen (assuming this plane to be substantially normal to the Z-axis) and K=I, the homography $M_i$ may be reduced to $$M_i = I - \frac{1}{d} t_i e_z^T.$$

Then $$M_i - \tilde{M}_{ij} M_j = \frac{-1}{d}(p_i - p_j - \tilde{p}_{ij})e_z^T$$

and the objective function to be minimized can be re-phrased as $$E(p_1, \ldots, p_N) = \frac{1}{2} \sum_i \sum_{j \in Nbd(i)} \|p_i - p_j - \tilde{p}_{ij}\|^2 \quad (6)$$

An exemplary linear system is described herein, which when solved minimizes eq. (6), in lieu of eq. (5).

First-principles derivation; an exemplary first-principles derivation may be based on a Graph Laplacian. For example, let r,c denote the row and column number for any acquired image tile and $I_{r,c}$ denote the acquired tile. Let $\tilde{p}_{r1,c1;r2,c2}$ denote the translation obtained by applying pairwise registration between neighbors $I_{r1,c1}$ and $I_{r2,c2}$. Note that $\tilde{p}_{r1,c1;r2,c2} = -\tilde{p}_{r2,c2;r1,c1}$. Let $p_{r,c}$ denote the global location of the time at r,c. Note that the indices for the N acquired image (N=RC) can be obtained by lexicographic ordering so that both the row and column number is encoded in a single index i. Based upon the 8-connected neighborhood information, a directed graph may be formed with N vertices and with the edge weights determined by the registration-based translation recovered between the neighboring images.

The location of the last tile $p_{R,C}$ (equivalently $p_N$) is fixed. Revised locations $(\hat{p}_{1,1}, \ldots, \hat{p}_{R,C,C-1})$ of the remaining RC−1 tiles may be found be minimizing the objective:

$$E(p_1, \ldots, p_N) = \quad (7)$$

$$\sum_{r=1}^{R-1} \sum_{c=1}^{C-1} \frac{1}{2}([(p_{r,c} - p_{r+1,c}) - \tilde{p}_{r,c;r+1,c}]^2 + [(p_{r,c} - p_{r,c+1}) - \tilde{p}_{r,c;r,c+1}]^2 +$$

$$[(p_{r,c} - p_{r+1,c+1}) - \tilde{p}_{r,c;r+1,c+1}]^2 +$$

$$[(p_{r,c+1} - p_{r+1,c}) - \tilde{p}_{r,c+1;r+1,c}]^2) +$$

$$\sum_{r=1}^{R-1} \frac{1}{2}[(p_{r,C} - p_{r+1,C}) - \tilde{p}_{r,C;r+1,C}] +$$

$$\sum_{c=1}^{C-1} \frac{1}{2}[(p_{R,c} - p_{R,c+1}) - \tilde{p}_{R,c;R,c+1}]^2 =$$

$$\sum_{i=1}^{N} \sum_{j \in Nbd(i), i<j} \frac{1}{2}[(p_i = p_j) - \tilde{p}_{i,j}]^2$$

The partial derivative of the above objective with respect to $p_i$, i=1, . . . , N−1 may be given by:

$$\frac{\partial E}{\partial p_i} = p_i \left( \sum_{j \in Nbd(i)} 1 \right) - \sum_{j \in Nbd(i)} p_j - \sum_{j \in Nbd(i)} \tilde{p}_{i;j} \quad (8)$$

Therefore, if $x=[p_1^x, \ldots, p_{N-1}^x]$ (note that the dimension of x is (N−1) and it is obtained by concatenating all the unknown X-coordinates), the revised X-coordinates may be obtained by solving the linear system Ax=y, where:

$$A_{ii} = \sum_{j \in Nbd(i)} 1 \quad (9)$$

$$A_{ij} = -1, \quad \text{if } j \in Nbd(i) \text{ and } j \neq i$$

$$A_{ij} = 0, \quad \text{if } j \notin Nbd(i) \text{ and } j \neq i$$

$$y_i = \sum_{j \in Nbd(i)} \tilde{p}_{i;j}^X \quad \text{if } N \notin Nbd(i)$$

$$y_i = p_N^X + \sum_{j \in Nbd(i)} \tilde{p}_{i;j}^X \quad \text{if } N \in Nbd(i)$$

Revised Y-coordinates may also be obtained by solving a similar linear equation.

Note that with full 8NN connectivity (as described above), the above matrix A of dimension (N−1)×(N−1) is invertible because the $N^{th}$ tile is included in the neighborhood connectivity. The matrix A is obtained by dropping the last row and column of an N×N connectivity graph Laplacian L=D−W, where D is a diagonal matrix such that $D_{ii}=\Sigma_{j \in Ndb(i)} 1$ and W is a binary adjacency matrix such that $W_{ij}=1$ if j∈Nbd(1) and j≠i.

Note that smaller weights may be assigned to the diagonal edges within the 8NN connectivity. In the example above the smaller weights are not used because the diagonal input translations appear to be as reliable as the vertical or horizontal translations.

Also, the above linear system can be modified to accommodate holes within the specimen by dropping the corresponding images, appropriately changing the 8NN connectivity and modifying the matrix A and the column vector b. If the holes end up disconnecting the specimen, then reference pixel coordinates need to be supplied for each connected component while solving one linear system per component. Note that partial holes that only remove a part of the 8NN connectivity may be accommodated.

Referring to FIG. 1A, all connected components may be found in N steps using depth-first-search or breadth-first-search using the binary adjacency matrix W (block 102Ai) and determining the matrices $A^c$ corresponding to each component (block 102Aii) until all tiles have been searched (block 102Aiii). According to an exemplary embodiment of the present disclosure, where each matrix $A^c$ is positive-definite, a Cholesky decomposition or a preconditioning conjugate gradient method may be used to solve a corresponding linear system.

Existing approaches do not consider a graph Laplacian and only work with an E×N edge-incidence matrix E with non-zero row entries $E_{ki}=1$ and $E_{kj}=-1$ if i<j and j∈E Nbd(i). Note that $L=E^T E$, where E is the edge-incidence matrix and $A=F^T F$, where F is obtained by dropping the last column of E.

Further, if a column vector t of all the E pairwise translations (X-components) and a column vector a of all the tile positions (X-components) are formed, then t−Ea. The vector x may be obtained by dropping the last entry of a and adding the X-component of the $N^{th}$ tile position to the appropriate elements of t resulting in the linear system t̄=Fx.

According to an exemplary embodiment of the present disclosure, the linear system t̄=Fx may be obtained with no spectral SVD decompositions.

Figure 3:
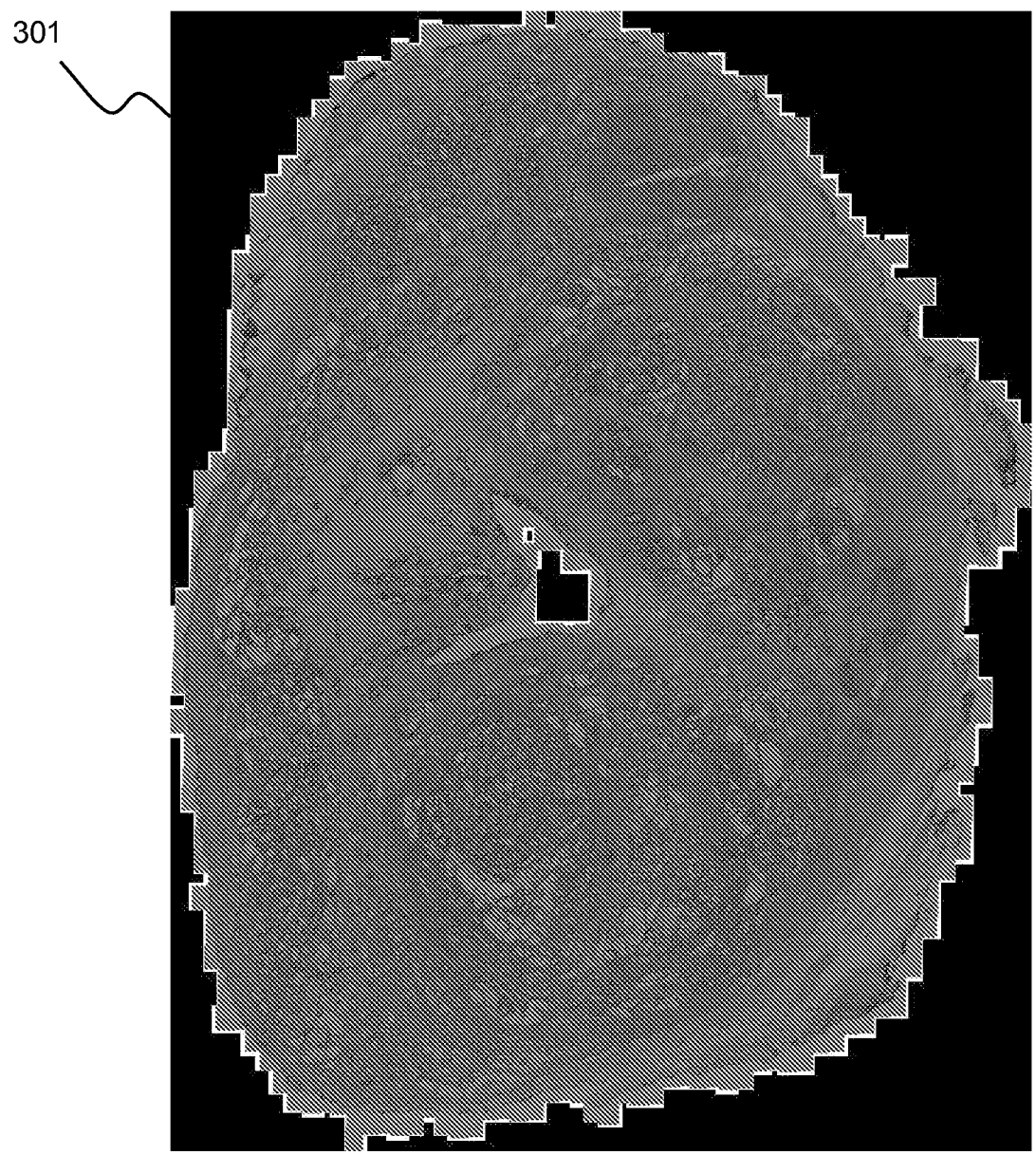
FIG. 3 is an exemplary stitched image from the 79×34 tiles according to an embodiment of the present disclosure.

FIG. 2 shows global positions, e.g., 201, determined for the largest component of a specimen comprising 79×34 tiles that contained both partial and full holes. On account of the holes, only 7942 pairwise translation out of a total possible 11207 8NN-connectivity edges were fed to a system embodiment a method according to the present disclosure and of these the system eliminated more than 50 components, e.g., relatively small components. Note the missing tiles (holes), e.g., 202, in the center of the specimen in FIG. 2. Also note the slight tilt in the X-coordinates possible on account of the backlash that occurs when the X-Y stage returns to its left-most X-coordinate after scanning an entire row. The complete stitched image 301 is shown in FIG. 3.

For speed-up, the matrix inverse of A may be pre-determined for different specimen sizes (e.g., different R and C) before acquiring any images. A run-time of about 1 minute has been observed on 80×40 images (tiles) for the global registration and a run-time of a few hours to obtain all pairwise translations.

Variations and Extensions

As described above, only one reference pixel position is used per connected component and this reference position may be the corresponding coordinates reported by the X-Y image. In the case of multiple connected components, extrapolation may be used in order to obtain reference coordinates that are a corrected version of the coordinates reported by the X-Y image.

An exemplary alternative to the connected components analysis (e.g., shown in FIG. 1A, block 102A) including using a prior term, e.g., location information reported by the slide-scanning microscopy X-Y stage, added to the objective function in (7) and enforcing an agreement between the unknown global coordinates and the coordinates reported by the X-Y image stage (block 102Bi). The prior term may have a weight of 0.5, though the value may be adjusted according to an application. The revised objective function for a quadratic prior term may be given by:

$$E(p_1, \ldots, p_N) = \frac{1}{2}\sum_{i=1}^{N} \sum_{j \in Nbd(i)} \|p_i - p_j - \tilde{p}_{ij}\|^2 + \frac{\lambda}{2}\sum_{i=1}^{N} \|p_i - \tilde{p}_i\|^2 \qquad (10)$$

where $\tilde{p}_i$ denotes the prior coordinates, e.g., those reported by the X-Y image stage (block 102Bii).

It should be understood that the connected components analysis shown in FIG. 1A and the objective function using prior information shown in FIG. 1B are alternatives, such that the connected components analysis may be implemented in the homography based example of FIG. 1B and the objective function using prior information may be implemented in the location based example of FIG. 1A.

The above microscopy mosaicking method determines 2D global positions for a planar specimen from 2D translations obtained via pairwise registration. However, it is possible to extend it to determine 3D global positions from 3D translations as in the confocal microscopy volumetric stitching application.

The determination of global coordinates may be made by L1 or L2 metrics. The L1 method is relatively outlier-resistant. For the L1 method, instead of a linear system solver, an iterative revision (e.g., optimization) may be used.

Moreover, the application scope of an exemplary general mosaicking method can be extended beyond microscopy to other applications such as geographical information systems or sea bed exploration wherein the overlapping parts of the acquired neighboring images (tiles) differ by a translation or by more general transformations. Pairwise transformations other than translations would use the objective function in (1). A solution may be obtained by zeroing the gradient of (1). Note that the same graph connectivity plays a role in the solutions for both the generic and the microscopy scenarios, as seen in equations (5) and (9).

It is to be understood that embodiments of the present disclosure may be implemented in various forms of hardware, software, firmware, special purpose processors, or a combination thereof. In one embodiment, a software application program is tangibly embodied on a non-transitory computer-readable storage medium, such as a program storage device or program product, with an executable program stored thereon. The application program may be uploaded to, and executed by, a machine comprising any suitable architecture.

Figure 4:
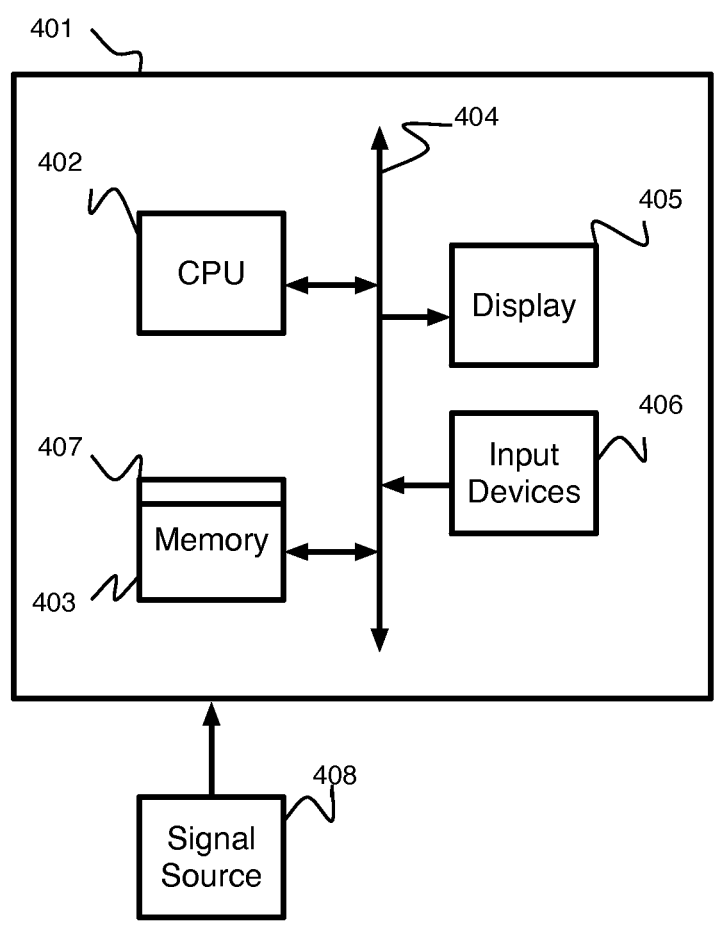
FIG. 4 is a system for executing an image mosaicking method according to an embodiment of the present disclosure.

Referring now to FIG. 4, according to an embodiment of the present disclosure, a computer system (block 401) for an image mosaicking method includes, inter alia, a central processing unit (CPU) (block 402), a memory (block 403) and an input/output (I/O) interface (block 404). The computer system (block 401) is generally coupled through the I/O interface (block 404) to a display (block 405) and various input devices (block 406) such as a mouse, keyboard and a slide-scanning microscopy X-Y stage. The support circuits can include circuits such as cache, power supplies, clock circuits, and a communications bus. The memory (block 403) can include random access memory (RAM), read only memory (ROM), disk drive, tape drive, etc., or a combination thereof. The present invention can be implemented as a routine (block 407) that is stored in memory (block 403) and executed by the CPU (block 402) to process the signal from the signal source (block 408). For example, the signal may include image information from a camera, which may be stored to memory (block 403) As such, the computer system (block 401) is a general purpose computer system that becomes a specific purpose computer system when executing the routine (block 407) of the present disclosure.

The computer platform (block 401) also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the system is programmed. Given the teachings of the present disclosure provided herein, one of ordinary skill in the related art will be able to contemplate these and similar implementations or configurations of the present disclosure.

Having described embodiments for an image mosaicking method, it is noted that modifications and variations can be made by persons skilled in the art in light of the above teachings. It is therefore to be understood that changes may be made in embodiments of the present disclosure that are within the scope and spirit thereof.

What is claimed is:

1. A non-transitory computer-readable storage medium with an executable program stored thereon, wherein the program instructs a microprocessor to perform an image mosaicking method, the method comprising:
performing pairwise registration of a plurality of tiles;
receiving prior homography information for each of the plurality of tiles;
determining absolute homographies for each of the plurality of tiles according to the pairwise registration by minimizing a following objective function $$E(p_1, \ldots, p_N) = \frac{1}{2}\sum_{i=1}^{N} \sum_{j \in Nbd(i)} \|p_i - p_j - \tilde{p}_{ij}\|^2 + \frac{\lambda}{2}\sum_{i=1}^{N} \|p_i - \tilde{p}_i\|^2,$$

wherein N is a number of tiles, Nbd(i) denote a set of tiles that share any overlap with tile i, $p_i$ denotes a homography of tile i, $\tilde{p}_{ij}$ denotes a translation obtained by applying the pairwise registration between neighboring tiles i and j, $\tilde{p}_i$ denotes the prior homography of tile i, and $\lambda$ denotes a predetermined weighting for the prior homography; and
performing a blending of the plurality of tiles to obtain a stitched image according to the absolute homographies.

2. The computer-readable storage medium of claim 1, wherein performing the pairwise registration comprises maximizing a similarity measure.

3. The computer-readable storage medium of claim 1, wherein determining the absolute homographies for each of the plurality of tiles comprises revising the pairwise registration according to an objective function for an edge incidence matrix of the plurality of tiles.

4. The computer-readable storage medium of claim 1, wherein performing the blending comprises an alpha-blending approach wherein a weight alpha is determined by raising a normalized distance of a pixel from an edge of its tile to an exponent.

5. The computer-readable storage medium of claim 1, wherein determining the absolute homographies for each tile comprises solving a linear system such that a global measure of registration is minimized.

6. The computer-readable storage medium of claim 1, wherein determining the absolute homographies for each tile comprises determining connected components given the pairwise registration of the plurality of tiles.

7. A computer-implemented method of performing image mosaicking, the method performed by the computer comprising the steps of:
performing pairwise registration of a plurality of tiles;
receiving prior homography information for each of the plurality of tiles;
determining absolute homographies for each of the plurality of tiles according to the pairwise registration by minimizing a following objective function $$E(p_1, \ldots, p_N) = \frac{1}{2}\sum_{i=1}^{N} \sum_{j \in Nbd(i)} \|p_i - p_j - \tilde{p}_{ij}\|^2 + \frac{\lambda}{2}\sum_{i=1}^{N} \|p_i - \tilde{p}_i\|^2,$$

wherein N is a number of tiles, Nbd(i) denote a set of tiles that share any overlap with tile i, $p_i$ denotes a homography of tile i, $\tilde{p}_{ij}$ denotes a translation obtained by applying the pairwise registration between neighboring tiles i and j, $\tilde{p}_i$ denotes the prior homography of tile i, and $\lambda$ denotes a predetermined weighting for the prior homography; and
performing a blending of the plurality of tiles to obtain a stitched image according to the absolute homographies.

8. The method of claim 7, wherein performing the pairwise registration comprises maximizing a similarity measure.

9. The method of claim 7, wherein determining the absolute homographies for each of the plurality of tiles comprises revising the pairwise registration according to an objective function for an edge incidence matrix of the plurality of tiles.

10. The method of claim 7, wherein performing the blending comprises an alpha-blending approach wherein a weight alpha is determined by raising a normalized distance of a pixel from an edge of its tile to an exponent.

11. The method of claim 7, wherein determining the absolute homographies for each tile comprises solving a linear system such that a global measure of registration is minimized.

12. The method of claim 7, wherein determining the absolute homographies for each tile comprises determining connected components given the pairwise registration of the plurality of tiles.

* * * * *